(12) United States Patent
Heifets et al.

(10) Patent No.: US 7,882,429 B2
(45) Date of Patent: *Feb. 1, 2011

(54) HIGH-LEVEL VIRTUAL MACHINE FOR FAST XML PARSING AND VALIDATION

(75) Inventors: Abraham Heifets, Cambridge, MA (US); Margaret G. Kostoulas, Veroia (GR); Michelle Anastasia Leger, Edgewood, NM (US); Moshe Morris Emanuel Matsa, Cambridge, MA (US); Eric Perkins, Boston, MA (US); Daniel Pinto de Mello e Silva, Bradenton, FL (US)

(73) Assignee: International Business Machines Corporation, Armonk, NY (US)

( * ) Notice: Subject to any disclaimer, the term of this patent is extended or adjusted under 35 U.S.C. 154(b) by 751 days.

This patent is subject to a terminal disclaimer.

(21) Appl. No.: 11/758,050

(22) Filed: Jun. 5, 2007

(65) Prior Publication Data

US 2008/0104592 A1 May 1, 2008

Related U.S. Application Data

(60) Provisional application No. 60/803,912, filed on Jun. 5, 2006.

(51) Int. Cl.
*G06F 17/00* (2006.01)

(52) U.S. Cl. .................. 715/237; 715/200; 715/234; 717/118

(58) Field of Classification Search ............... 715/234, 715/237, 200; 717/118
See application file for complete search history.

(56) References Cited

U.S. PATENT DOCUMENTS

| 6,782,379 | B2 |  | 8/2004 | Lee |  |
|---|---|---|---|---|---|
| 6,789,252 | B1 |  | 9/2004 | Burke et al. |  |
| 7,200,805 | B2 | * | 4/2007 | Carlson et al. | 715/237 |
| 2001/0047385 | A1 |  | 11/2001 | Tuatini |  |
| 2001/0054172 | A1 | * | 12/2001 | Tuatini | 717/1 |
| 2002/0111965 | A1 | * | 8/2002 | Kutter | 707/513 |
| 2004/0073870 | A1 | * | 4/2004 | Fuh et al. | 715/513 |
| 2004/0216086 | A1 | * | 10/2004 | Bau | 717/114 |
| 2005/0038816 | A1 | * | 2/2005 | Easton | 707/104.1 |
| 2005/0097455 | A1 | * | 5/2005 | Zhou et al. | 715/513 |
| 2006/0129605 | A1 | * | 6/2006 | Doshi | 707/104.1 |
| 2006/0259898 | A1 |  | 11/2006 | Reinhardt |  |
| 2007/0250766 | A1 | * | 10/2007 | Medi et al. | 715/513 |
| 2007/0282894 | A1 | * | 12/2007 | Schneider | 707/102 |
| 2008/0104095 | A1 |  | 5/2008 | Heifets |  |
| 2008/0104105 | A1 | * | 5/2008 | Heifets et al. | 707/102 |

* cited by examiner

*Primary Examiner*—Thu Huynh
(74) *Attorney, Agent, or Firm*—Cuenot, Forsythe & Kim, LLC

(57) ABSTRACT

A computer-implemented method of processing an Extensible Markup Language (XML) document can include loading an execution plan into a virtual machine, wherein the execution plan represents an XML schema, and loading an XML document into the virtual machine. XML processing functions available within the virtual machine can be selectively invoked according to the execution plan, wherein the XML processing functions operate upon the XML document. An indication of whether the XML document is valid according to the XML processing functions can be output.

20 Claims, 7 Drawing Sheets

400

| XML Processing Instruction / Function Name | Functionality |
|---|---|
| READ_TAG *ISMIXED* | Read forward to the end of the next tag in either mixed mode (allowing both text characters and elements) or element-only mode. The tag to be consumed may be any start or end tag. End tags are checked for well-formedness against matching or corresponding start tags. |
| READ_TAG_WITH_QNAME *ISMIXED QNAME* | Read forward to the end of the next tag in either mixed mode or element-only mode. While scanning, validate that the name of the tag matches the given QName. The input stream can be directly compared against a fixed tag name. Symbol table lookup is avoided since the identifier is already known. |
| READ_END_TAG *ISMIXED* | Read forward to the end of the next tag in either mixed mode or element-only mode. While scanning, verify that the tag is an end tag, and match the end tag lexically against the balancing start tag. Compares the input buffer against a known string, in this case the balancing start tag. |
| READ_EMPTY | Read the next tag, which must be an end tag, and must match the corresponding and balancing start tag. Validate that there is no intervening character content. This instruction functions similar to READ END TAG, except that it also validates that no character content was read. |
| READ_SIMPLE_CONTENT *TYPEID* | Read character data forward to the end of the next tag, which must be an end tag, and must match its balancing start tag. Validate the intervening content using the built-in simple type handler given by the type ID. Content is handled by a type-specific scanner that can validate the content as scanned. The end tag can be handled as in READ END TAG. |
| READ_EOF | Read forward to the end of the file, matching the XML production for TrailingMisc, e.g., checking well-formedness of comments, processing-instructions, white-space, etc. |

| XML Processing Instruction / Function Name | Functionality |
|---|---|
| ASSERT_TAG_QNAME *ALLOWEDQNAMES={QNAMEID ...}* | Assert that the current tag matches one of the members of the set of allowed QNames. |
| ASSERT_ATTRS *ALLOWEDATTRIBUTESET REQUIREDATTRIBUTESET* | Assert that the attributes of the current tag obey the collective attribute occurrence constraint as represented with two sets, one for excluded attributes and one for required attributes. |
| ASSERT_ATTR_CONTENT *QNAMEID TYPEID* | Check the attributes of the current tag for the given attribute QName, and if present, validate content using the built-in simple type handler given by the type ID. |
| FAIL | Unconditional assertion failure. |

| XML Processing Instruction / Function Name | Functionality |
|---|---|
| PUSH_NEW_ALL_OCCURRENCE_SET | Push a new, empty set onto the all occurrence set stack. |
| TEST_AND_SET_ENTRY *ID* | Add the given ID to the current set, asserting that the given ID was not already present. |
| POP_ASSERT_SET *REQD SET* | Pop the current set off of the set stack and assert that the current set is a superset of the given required IDs to check "all group" occurrence constraints of XML schema. |
| PUSH_COUNTER | Push a new counter onto the stack and initialize to zero. |
| INCREMENT_COUNTER | Increment the top counter on the stack. |
| POP_COUNTER | Discard the top counter on the stack. |
| JUMP_COUNTER_LESS *VALUE LABEL* | Branch to the given label if the top counter is less than the given value. |
| ASSERT_COUNTER_ GREATER_OR_EQUAL *VALUE* | Assert that the top counter is greater or equal to the given minimum value. Otherwise, fail. |

| XML Processing Instruction / Function Name | Functionality |
|---|---|
| JUMP_TAG_NOT_EQUAL *QNAMEID OFFSET* | Branch to the instruction at the given offest if the tag does not match the given QName. |
| JUMP_UNCONDITIONAL *OFFSET* | Branch unconditionally to the given offset. |
| CALL_TYPE *NIL DEFAULTTYPE EXCLUDEDTYPESET* | Dispatch to the content model for the current start tag. The content model is determined either by the instance value of xsi:type or by the supplied default type ID. The actual type ID is checked against the type exclusions set (EXCLUDEDTYPESET ). The excluded types aggregate the various constraints on the runtime type of the elements as specified by the element declaration and the type definition for the default type. If the resolved type is complex, the parser dispatches to the handler for that complex type, and resumes processing. If the resolved type is simple, the corresponding built-in simple type handler is used. The NIL argument tells the complex type which processing is allowed for xsi:nil in this context. |
| RETURN | Return control from the current complex type handler to its caller. |
| RETURN_IF_NIL | Check the attributes of the current tag for the xsi:nil attribute. If present and bearing the value true, read the next tag as in READ EMPTY, and return control from the current complex type handler to its caller. In all other cases, continue execution. |

```
<xsd:complexType name="ExampleType">
        <xsd:sequence>
                <xsd:choice>
                        <xsd:element name="Name1" type="Type1"/>
                        <xsd:element name="Name2" type="Type2"/>
                </xsd:choice>
                <xsd:element name="Name3" type="Type3"/>
        </xsd:sequence>
<xsd:attribute name="attr1" type="xsd:string" use="required"/>
<xsd:attribute name="attr2" type="xsd:string"/>
<xsd:attribute name="attr3" type="xsd:string"/>
</xsd:complexType>
```

```
<exampleType attr1="foo" attr2="bar" attr3="baz">
        <Name2> .... </Name2>
        <Name3> .... </Name3>
</exampleType>
```

```
ASSERT_ATTRS AllowedAttributeSet={'attr1','attr2','attr3'}
        RequiredAttributeSet={'attr1'}
ASSERT_ATTR_CONTENT 'attr1' xsd:string
ASSERT_ATTR_CONTENT 'attr2' xsd:string
ASSERT_ATTR_CONTENT 'attr3' xsd:string
READ_TAG QNAMES element-onlyAllowedNames={'Name1', 'Name2'}
JUMP_TAG_NOT_EQUAL 'Name1' 3
CALL_TYPE non-nillable defaultType=Type1 AllowedTypes={Type1}
JUMP_UNCONDITIONAL 2
CALL_TYPE non-nillable defaultType=Type2 AllowedTypes={Type2}
READ_TAG_WITH_QNAME element-only 'Name3'
CALL_TYPE non-nillable defaultType=Type3 AllowedTypes={Type3}
READ_END_TAG
RETURN
```

FIG. 11

HIGH-LEVEL VIRTUAL MACHINE FOR FAST XML PARSING AND VALIDATION

CROSS-REFERENCE TO RELATED APPLICATIONS

This application claims the benefit of Provisional Patent Application No. 60/803,912, filed in the United States Patent and Trademark Office on Jun. 5, 2006, the entirety of which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Extensible Markup Language (XML) refers to a flexible type of data encoding. XML coded messages can be exchanged between computer programs of a system without concern over aspects of the system such as the type of programming language in which each respective computer program is implemented, the type of information processing systems involved, or the manner of message transmission. XML allows virtually any component of a system, e.g., a UNIX program, to communicate with any other component of the system, e.g., a program written in the C programming language for execution within a Windows-type of computing environment.

XML schemas specify classes of allowable XML documents, or XML messages, that a system will accept. In general, an "XML schema" refers to a type of XML document that expresses constraints on the structure and content of XML documents that can be accepted by a given system. Publishing an XML schema allows a system to define the type of messages that the system is willing to accept. A validating parser can analyze received XML documents with respect to an XML schema and discard non-conforming or invalid XML documents.

BRIEF SUMMARY OF THE INVENTION

The present invention relates to processing Extensible Markup Language (XML) documents. One embodiment of the present invention can include a computer-implemented method of processing an XML document including loading an execution plan into a virtual machine, wherein the execution plan represents an XML schema, and loading an XML document into the virtual machine. XML processing functions within the virtual machine can be selectively invoked according to the execution plan. The XML processing functions can operate upon the XML document. An indication of whether the XML document is valid can be output according to the XML processing functions.

Another embodiment of the present invention can include a system that processes XML documents. The processing system can include an information processing system and a virtual machine executing within the information processing system. The virtual machine can include a plurality of functions, wherein each of the plurality of functions is an XML processing function.

Yet another embodiment of the present invention can include a computer program product including a computer-usable medium having computer-usable code that, when executed, causes a machine to perform the various steps and/or functions described herein.

BRIEF DESCRIPTION OF THE SEVERAL VIEWS OF THE DRAWINGS

FIG. 4 is a table illustrating XML processing instructions and associated XML processing functions of a virtual machine in accordance with another embodiment of the present invention.

FIG. 5 is a table illustrating XML processing instructions and associated XML processing functions of a virtual machine in accordance with another embodiment of the present invention.

FIG. 6 is a table illustrating XML processing instructions and associated XML processing functions of a virtual machine in accordance with another embodiment of the present invention.

FIG. 7 is a table illustrating XML processing instructions and associated XML processing functions of a virtual machine in accordance with another embodiment of the present invention.

FIG. 9 is an example of an XML schema fragment which is useful for understanding embodiments of the present invention.

FIG. 10 is an example of an XML document that is to be processed according to the XML schema fragment of FIG. 9.

FIG. 11 is an example of a fragment of an execution plan that can be automatically generated by the system of FIG. 1 in accordance with another embodiment of the present invention.

DETAILED DESCRIPTION OF THE INVENTION

Figure 1:
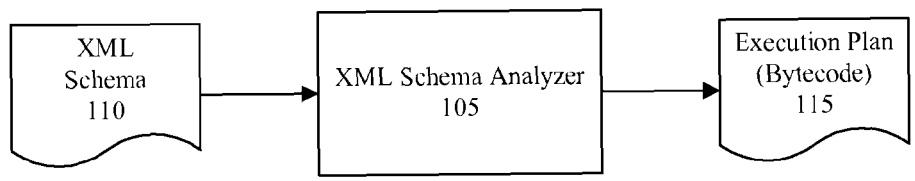
FIG. 1 is a block diagram illustrating a system that automatically generates an execution plan for processing an Extensible Markup Language (XML) document in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or other similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to a virtual machine for use in processing Extensible Markup Language (XML) documents. An execution plan can be generated according to a hierarchy of components specified by an XML schema. The execution plan, in general, is a program that specifies the requirements of the XML schema. Once converted or compiled into a bytecode format, the execution plan can be loaded into the virtual machine along with an XML document to be processed according to the XML schema.

The virtual machine can be configured with a plurality of different portions of code, or functions, specifically suited for XML document processing. These XML processing functions can be large, or "chunky," in that fewer instructions are needed to process the XML document as compared to a conventional high level programming language such as C, Java, or the like. For example, a single XML processing function available within the virtual machine can replace hundreds of lines of Java code. In one embodiment, the virtual machine can be limited to only offer or include such XML processing functions and no other functionality.

The XML document can be processed through execution of the execution plan within the virtual machine. Because fewer instructions are needed to process the XML document, the overhead associated with interpreting bytecode instructions is reduced. The virtual machine can output an indication as to whether the XML document is valid according to the specified XML schema or execution plan. Supplemental information further can be output from the virtual machine if so desired.

FIG. 1 is a block diagram illustrating a system 100 that can automatically generate an execution plan 115 in accordance with one embodiment of the present invention. The execution plan 115, when executed by an appropriate virtual machine (not shown), can implement a schema specific parser that can process XML documents and ensure that such documents conform to a given XML schema. As shown, the system 100 can include an XML schema analyzer 105. In general, the XML schema analyzer 105, given an XML schema, such as XML schema 110, as input, can generate and output an execution plan 115.

In one embodiment, the execution plan 115 can be a hierarchically ordered listing of instructions, referred to as XML processing instructions, that correspond to XML processing functions that are available within a virtual machine. The execution plan 115 can be compiled into bytecode that is interpretable by the virtual machine. In this sense, the execution plan can be considered to be a bytecode program that is executed by the virtual machine.

As used herein, the term "bytecode" can refer to machine-independent code, which may be binary code, that can be interpreted or executed by a virtual machine. Typically, a program written in a particular programming language is compiled into a bytecode program. The phrase "virtual machine," as used herein, can refer to a self-contained operating environment that behaves like an independent computer system. Virtual machines also are referred to as "interpreters" or "runtime environments." Typically a virtual machine operates in conjunction with, yet independently of, a host operating system. Virtual machines are configured to execute bytecode programs. Each instruction in a bytecode program can reference a particular function embedded or otherwise included within the virtual machine. As each bytecode instruction is executed, the functionality within the virtual machine that maps to, or is associated with, the executed bytecode instruction can be invoked or executed.

In one embodiment of the present invention, a virtual machine can be configured to include a plurality of functions for XML document parsing and/or XML document validation called XML processing functions (functions). Each function can be written at a high level of granularity to perform a particular function that is needed or related to processing an XML document with respect to a given XML schema, XML schema component, and/or element. For example, a single function can perform an XML processing function that, if written in a conventional high level programming language such as C or Java, would require possibly hundreds of lines of code. The bytecode instructions of the execution plan 115 can map to or indicate particular ones of the functions of the virtual machine to invoke.

The XML schema analyzer 105 can receive an XML schema 110 as input. In general, the XML schema analyzer 105 can analyze the XML schema 110 on a component-by-component basis and determine the hierarchy of the XML schema 110. For example, the XML schema analyzer 105 can determine the arrangement of components of the XML schema 110 as well as the structure of such components. In one embodiment, the XML schema analyzer 105 can perform a mapping of components of the XML schema 110 to available functions of the virtual machine. Through this mapping process, an execution plan specifying a hierarchy of XML processing instructions can be generated. The hierarchy of XML processing instructions, and therefore functions, can mirror the hierarchy of the XML schema 110, thereby specifying the allowable structure and form of XML documents.

Conventional XML parser generators typically translate an XML schema into an abstract form called "Deterministic Finite Automata" (DFA) or other grammars. DFA or other grammars are collections of states, with transitions between each state specified on different possible inputs. Such grammars are representations of the XML schema that does not explicitly encode any portion of the XML Schema semantics.

In accordance with the embodiments disclosed herein, a substantial portion, if not all, of the execution plan can be mapped directly to the XML schema components. That is, the execution plan can explicitly encode one or more portions or all of the XML schema in the form of XML processing instructions that invoke the functions of the virtual machine. The XML schema analyzer 105 can compile the execution plan to produce a bytecode implementation of the execution plan 115.

Figure 2:
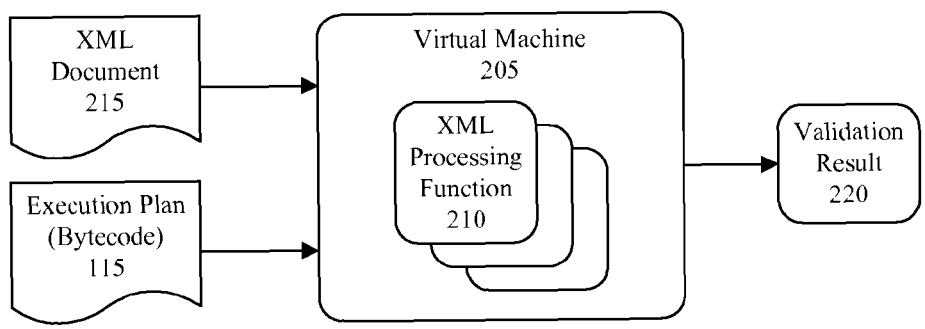
FIG. 2 is a block diagram illustrating a system for processing an XML document in accordance with another embodiment of the present invention.

FIG. 2 is a block diagram illustrating a system 200 for processing an XML document in accordance with another embodiment of the present invention. The system 200 can include a virtual machine 205. The virtual machine 205 can include one or more functions 210. Each of the functions can be associated with a given bytecode instruction. In one embodiment, the virtual machine 205 can be configured to only include functionality relating to XML document processing. Accordingly, each of the functions 210 can relate solely to XML document parsing and/or validation and perform such functions. A virtual machine configured in this manner has limited functionality, but increased performance in terms of XML document processing. In another embodiment, each of the functions 210 included in the virtual machine 205 can be native code implementations. That is, each of the functions 210 included as part of the virtual machine 205 can be compiled into machine code.

In illustration of the XML processing functionality of the virtual machine 205, one function 210 can read a tag of the XML document being processed. Another function 210 can check attributes allowed for the component corresponding to that tag. A "component," as used herein, can refer to a component as defined in section 3 of "XML Schema Part 1: Structures Second Edition, W3C," and "XML Schema Part 2: Datatypes Second Edition," which are incorporated herein by reference.

In one embodiment, the functions 210 of the virtual machine 205 can be organized or combined to form handlers. As such, each handler can include one or more functions. For example, a handler that will be tasked with, among other things, validating a date can include a function for validating dates. The function may or may not be passed one or more parameters that can be extracted from the XML schema. Other functions can be included within different handlers as may be required. In another embodiment, a handler can refer to a collection of one or more functions that collectively process a component. Without such "coarse-grained" procedures, in reference to both handlers and functions, processing an XML document would be implemented using much lower level primitives, e.g., on the order of using many individual programming statements rather than functions 210 directed to the component and/or element level.

The virtual machine 205 can load an XML document 215 as well as the execution plan 115. Loading the execution plan 115 into the virtual machine 205, effectively, results in a schema specific parser that can process the XML document 215 in accordance with a particular XML schema, e.g., the XML schema 110 of FIG. 1. It further should be appreciated that the virtual machine 205 effectively can be re-configured to implement a different schema specific parser simply by loading an execution plan derived from a different XML schema.

Upon loading and executing the execution plan 115, the virtual machine 205 effectively is configured as a schema specific parser. This configuration can include a parsing, e.g., scanning, layer that can read XML document 215 byte-by-byte as well as a validation layer. The functions 210 can implement both layers such that when executed, the two layers can be intermingled. In illustration, the parsing functionality can be mixed with the validation functionality such that when a component or other section of an XML document is scanned, as soon as enough information is scanned to determine whether the component or section is valid or invalid, as the case may be, the virtual machine 205 can make a determination at that moment and output a validation result 220. The validation result 220 can indicate whether the XML document 215 is valid or invalid.

For example, a simple content component can be read such as a date. The validation layer can determine whether the data is of the correct type prior to proceeding, or scanning, a next component. If not a date, for example, the virtual machine 205, in executing the execution plan 115, can indicate that the XML document 215 is invalid immediately upon determining the nonconforming component or element rather than continue processing until an end tag is encountered.

As noted, the functions 210 of the virtual machine 205 can be configured so that each function, or selected functions, implement both the parsing and validation layers. This allows data items such as dates or integers to be scanned and validated. In other words, after reading each character and checking that the characters that were read are legal XML data characters, the functions further can be configured to verify that the data item is legal, e.g., a legal date or integer character, in the read location. The data can further be stored for validation.

For example, consider a decimal that the XML schema restricts to be less than 100. A decimal starting with "2" can continue only with 0-9, dot ("."), or finish. Accordingly, the function 210 need not determine that the next character is any valid character, but one of the enumerated choices noted above. If, for example, the next character is "6" the function 210 can determine that the decimal is now "26." When the end of the decimal is identified, a check can be performed to determine whether the decimal is less than 100. As such, the data does not have to be revisited after parsing for validation. A separate pass of the data need not be performed solely for validation. The same sort of processing can be performed for dates. With respect to tag-reading, functions can perform similar functionality when tag names are not only valid XML name characters, but also are valid for exactly that tag name.

Figure 3:
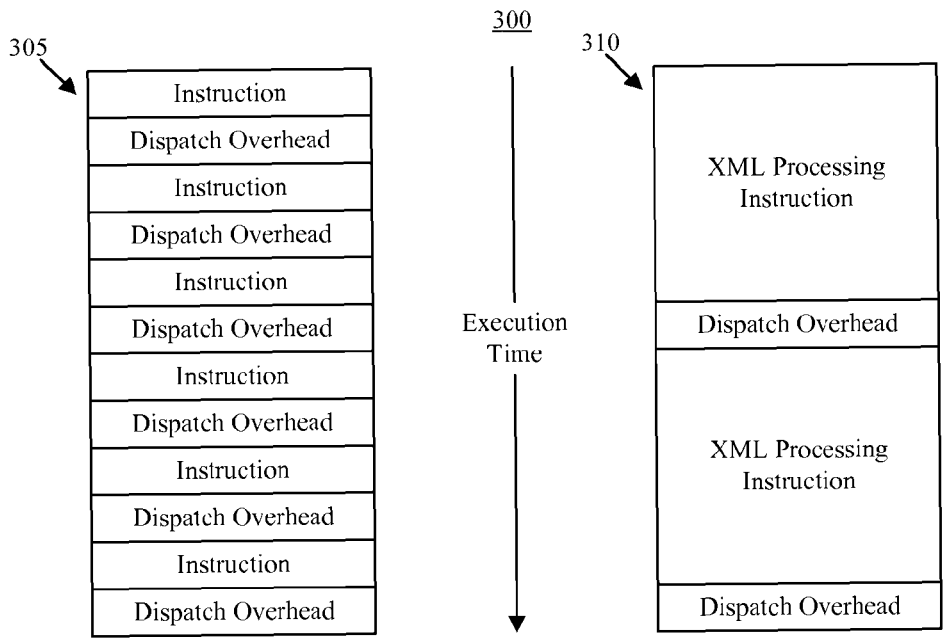
FIG. 3 is a block diagram illustrating virtual machine functionality in accordance with another embodiment of the present invention.

FIG. 3 is a block diagram 300 illustrating the functionality of a virtual machine in accordance with another embodiment of the present invention. Block 305 illustrates virtual machine execution of a conventional bytecode program with low level primitives as instructions. Between each instruction, dispatch overhead is incurred which represents the time needed for the virtual machine to determine the appropriate virtual machine function for a given bytecode instruction.

Block 310 illustrates virtual machine execution of an execution plan in accordance with the embodiments disclosed herein. While dispatch overhead still occurs between each XML processing instruction (or resulting bytecode instruction after compilation), the course-grained nature of the functions executed for each respective bytecode instruction serves to reduce the dispatch overhead relative to the amount of work performed. Block 310 illustrates that when fewer instructions, e.g., course-grained instructions, are used to accomplish an amount of work that otherwise would require many more bytecode instructions, dispatch overhead decreases and operational efficiency increases. More work is performed per unit of dispatch overhead. Moreover, as the range of operations supported by the virtual machine is limited to XML document processing, the virtual machine implementation can be smaller and more efficient. In other words, if a given amount of work performed by two simple instructions can be performed by a single, more complex instruction, the dispatch overhead is reduced, resulting in a more efficient system.

FIGS. 4-7, taken collectively, illustrate a variety of XML processing instructions that can be included within execution plans and corresponding functions, referenced by the XML processing instructions, that can be included within the virtual machine. The functions of FIGS. 4-7 represent basic primitives of XML parsing and validation and, as such, are designed to be coarse-gained. The XML processing instructions are shown in capital letters while parameters of the XML processing instructions are indicated in italics.

It should be appreciated that qualified names can be represented in a number of ways such as character strings or symbol table ID numbers. Sets can be represented as bit-vectors, linked lists, arrays, hash-maps, or the like. Control flow may be represented with any of a variety of common techniques such as jumps to offsets, "gotos" to labels, or branching constructs such as if/then/else, switch, choose/when/otherwise, or while/do/end. Allowed and forbidden may be interchangeable representations, e.g., through set negation. The functions illustrated herein are intended to demonstrate the high level of granularity used, e.g., "chunky" functions, as compared to conventional techniques that utilize low level code. Other alternative logic types or constructs similar to those noted above can be used in place of those illustrated in the tables.

FIG. 4 is a table 400 illustrating XML processing instructions and associated functions of a virtual machine configured in accordance with another embodiment of the present invention. As noted, the XML schema analyzer of FIG. 1 can create an execution plan including XML processing instructions that reference the functions of the virtual machine. The order and hierarchy in which the functions are referenced can be determined according to the hierarchy and/or structure of the XML schema being analyzed.

Table 400 illustrates various functions that read components and/or sections of an XML document into the virtual machine. Portions of the XML document being validated are read into the virtual machine on a byte-by-byte level. Decisions affecting execution of the parsing and/or validation occur on a component-by-component level. In this regard, one or more of the functions can be combined, or called, to parse and/or validate a particular type of component of the XML schema, e.g., simple, complex, mixed, etc. It should be appreciated that, with respect to the descriptions of the various functions, the term "tag" can refer to any start or end tag, including all of the attributes of a tag. Empty element tags can be treated as if the empty element tags have been expressed in an equivalent syntax using separate start and end tags, with no intervening content.

FIG. 5 is a table 500 illustrating XML processing instructions and associated functions of a virtual machine configured in accordance with another embodiment of the present invention. The functions listed in table 500 illustrate functions for checking that a section, once read, matches the type of the component to which the section is to correspond per the XML schema. For example, an open tag must contain the attributes and child elements specified by the declaration type of the component of the tag. A close tag must match the corresponding, or matching, open tag. The functions listed in table 500 check that a component can legally occur in the current XML document position and that the section is the correct type.

FIG. 6 is a table 600 illustrating XML processing instructions and associated functions of a virtual machine configured in accordance with another embodiment of the present invention. The functions listed in table 600 manipulate counters that can be used in counting and/or otherwise dealing with components. Since components can be constrained to have a minimum and/or a maximum number of occurrences within a component, the functions listed in table 600 provide mechanisms for monitoring the number of such occurrences and comparing the occurrences with the minimum and/or maximum number of occurrences specified in the XML schema.

"All group" occurrence constraints in an XML schema allow one to specify that an element needs to include several different children. If any one of the needed children is missing, validation of the XML document fails. This aspect of XML is useful, for example, for representing C structs and/or Java objects, where values are accessed by named fields and are not ordered.

In one embodiment, when validating an input, a set corresponding to the all-group constraint can be maintained within the virtual machine. The set may be empty if the XML schema does not use all-group constraints. When a new child is encountered in an all-group constraint, the occurrence of the child can be marked or recorded in the set corresponding to the all-group constraint. When the end of the portion defining the all-group constraint is encountered in the XML document being validated, a check can be performed to ensure that each required child of the all-group constraint was encountered, and thus marked within the set corresponding to the all-group constraint. If a given required child is not encountered, the XML document fails. Since all-group constraints can be nested, a stack of such sets can be used. When a new all-group constraint is encountered, a new set is pushed onto the stack. The set can be popped off of the stack to return to the previous constraint.

FIG. 7 is a table 700 illustrating XML processing instructions and associated functions of a virtual machine configured in accordance with another embodiment of the present invention. The functions listed in table 700 provide mechanisms for flow control. The functions of table 700 allow the appropriate function to be located for processing a next component type or section of an XML document being processed.

Figure 8:
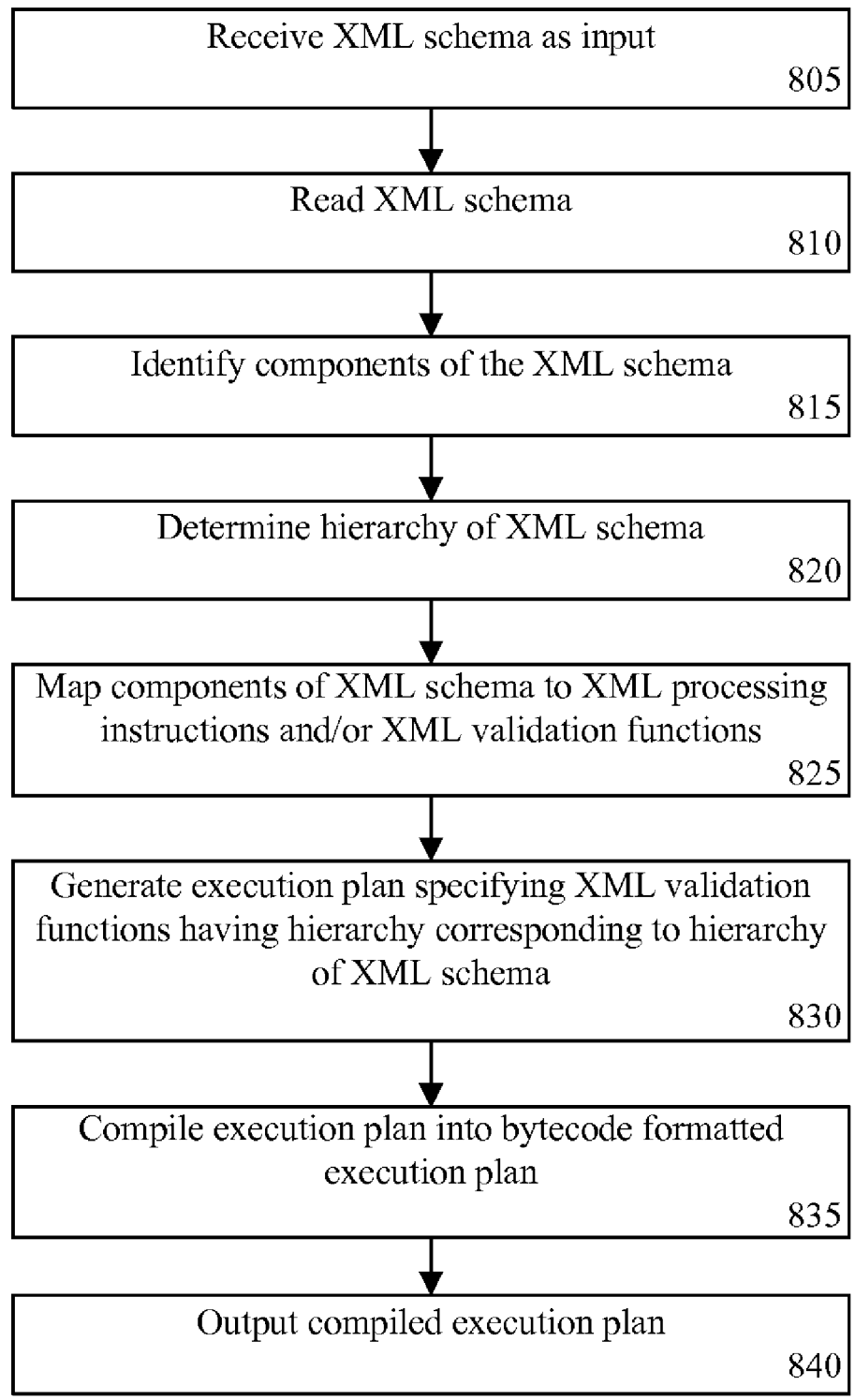
FIG. 8 is a flow chart illustrating a method of creating an execution plan in accordance with another embodiment of the present invention.

FIG. 8 is a flow chart illustrating a method 800 of creating an execution plan in accordance with another embodiment of the present invention. The method 800 can be implemented by an XML schema analyzer as described with reference to FIG. 1. Accordingly, in step 805, the XML schema analyzer can receive an XML schema as input. The XML schema analyzer can load the XML schema.

In step 810, the XML schema analyzer can read the XML schema. In step 815, the XML schema analyzer can identify the various components of the XML schema. In step 820, the XML schema analyzer can determine a hierarchy of the XML schema. The hierarchy of the XML schema reflects the structure of the XML schema, as well as the structure of the XML documents to be processed according to the XML schema. For example, the nesting of components and sub-components can be determined. In step 825, the components of the XML schema can be mapped to a plurality of bytecode instructions, e.g., XML processing instructions, and therefore functions of the virtual machine. In step 830, an execution plan specifying a hierarchy of XML processing instructions can be generated. The hierarchy specified by the execution plan can match or correspond to the hierarchy of components of the XML schema.

In step 835, the execution plan can be compiled into a bytecode program or version of the execution plan. In compiling the execution plan, any dependent references can be resolved. Various parameters needed by particular functions, e.g., minimum and/or maximum component occurrences, can be determined. In this manner, the XML processing instructions can be parameterized according to the components of the XML schema. The parameterized execution plan can be converted into bytecode. Parameters of the bytecode instructions can be passed to the function(s) within the virtual machine when the execution plan is executed. In step 840, the parser-generator can output the compiled execution plan. The execution plan represents the XML schema. As noted, one or more portions of the execution plan can correspond directly to one or more portions of the XML schema.

FIG. 9 is an example of an XML schema fragment 900 which is useful for understanding the embodiments disclosed herein. The XML schema fragment 900 defines a component, and more particularly, a complex type component "ExampleType." The ExampleType component has three attributes denoted as "attr1," "attr2," and "attr3," as well as a sequence of several components, e.g., sub-components. The sequence of sub-components can include either one of "Name1" or "Name2" followed by "Name3."

FIG. 10 is an example of an XML document 1000 that is to be processed according to the XML schema fragment pictured in FIG. 9. The XML document 1000 includes a sequence of child elements including "Name2" followed by "Name3". The XML document 1000 further specifies values for each of attributes attr1, attr2, and attr3.

FIG. 11 is an example of a fragment of an execution plan 1100 that can be automatically generated by the system of FIG. 1 in accordance with another embodiment of the present invention. The execution plan fragment 1100 represents a parameterized, source code version of the execution plan, e.g., including XML processing instructions prior to compilation or conversion to bytecode. As used herein, "source code" can refer to a code listing or source listing. As noted, execution of the execution plan 1100 by a virtual machine as disclosed herein requires the virtual machine to implement the necessary functions to parse and/or validate an XML document, e.g., XML document 1000, per a given XML schema, e.g., XML schema fragment 900. As each instruction can be associated with a function of the virtual machine, it should be appreciated that reference to an XML processing instruction in discussing execution plan fragment 1100 further can reference the function that is invoked within the virtual machine that corresponds to the XML processing instruction.

Since the XML schema fragment provides for three attributes, one of which is required, the "ASSERT_ATTRS" XML processing instruction is inserted with parameters permitting the attributes and requiring one. After, three "ASSERT_ATTR_CONTENT" XML processing instructions are inserted into the execution plan fragment 1100 to ensure that the type of the attribute content is as specified in the XML schema fragment. The "READ_TAG_QNAMES" XML processing instruction obtains the next block of data from the instance document, in this case the XML document being validated as pictured in FIG. 10 and checks that the next component, in this case "Name2," is a legal follower of the previous component. The "READ_TAG_QNAMES" XML processing instruction ensures that the found tag is in the set of permitted tags. The "JUMP_TAG_NOT_EQUAL" XML processing instruction causes flow control to branch to the specified jump offset when the current tag name does not match the provided component name. The "CALL_TYPE"

XML processing instruction checks the instance element for xsi-type declarations and jumps to the appropriate complex handler for the determined type (whether from the instance or the XML Schema specified default type). The remaining functions referenced in the execution plan fragment 1100 perform functions similar to those already discussed.

Figure 12:
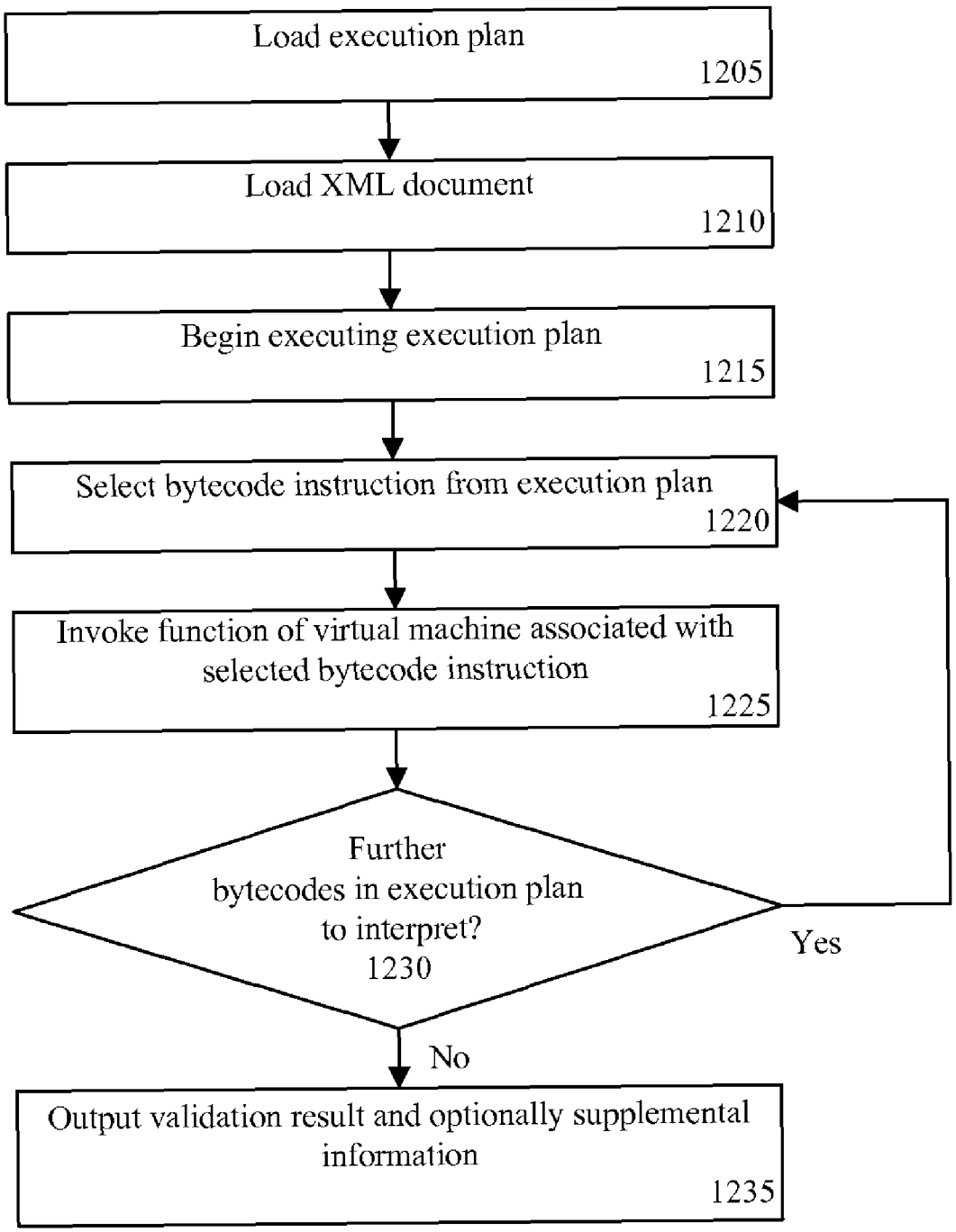
FIG. 12 is a flow chart illustrating a method of operation of a virtual machine configured to process XML documents in accordance with another embodiment of the present invention.

FIG. 12 is a flow chart illustrating a method 1200 of operation of a virtual machine configured to validate XML documents in accordance with another embodiment of the present invention. The method 1200 can be implemented by a virtual machine configured as discussed herein, e.g., the virtual machine of FIG. 2. Accordingly, in step 1205, the virtual machine can load an execution plan. In step 1210, the virtual machine can load an XML document. In step 1215, the virtual machine can begin executing the execution plan.

In step 1220, the virtual machine can select a bytecode instruction from the execution plan. For example, the virtual machine can read and/or interpret the bytecode instructions of the execution plan and select a first, or next as the case may be, bytecode instruction. In step 1225, a function of the virtual machine that is associated with the selected bytecode instruction can be invoked. Any parameters needed by the function can be obtained or passed in from the bytecode instruction.

In step 1230, the virtual machine can determine whether any further bytecodes remain in the execution plan for interpretation. If so, the method can loop back to step 1220 to continue execution of the execution plan. If not, the method can proceed to step 1235. In step 1235, the virtual machine executing the execution plan can output a validation result for the XML document. The validation result can be determined via operation of the functions, as selected by the execution plan, upon the XML document.

In one embodiment, the validation result can specify whether the received XML document was valid or not. In another embodiment, the validation result can specify supplemental information including, but not limited to, a Post Schema Validation Infoset (PSVI) in any of a variety of formats. A PSVI, for example, can specify information about how validation occurred or other supplemental information indicating various internal parameters of the virtual machine during parsing and/or validation.

In another embodiment, the particular execution plan that is loaded by the virtual machine can be selected from a plurality of different execution plans, where each execution plan is derived from a different XML schema. In this regard, the virtual machine effectively can implement any of a variety of different XML schema specific parsers according to the particular execution plan that is loaded into the virtual machine. Thus, a first execution plan can be loaded to validate a first XML document against a first XML schema. A second execution plan then can be loaded to validate a second XML document against a second XML schema, etc. The process of loading and/or unloading different execution plans further can be programmatically automated, follow a predetermined pattern, and/or be dynamically determined, for example, by another system communicatively linked with the virtual machine.

It should be appreciated that while an XML document can be processed according to an XML schema, it is the execution plan that expresses the XML schema. The virtual machine executes the execution plan. Accordingly, the virtual machine can process an XML document using the execution plan without reference to the XML schema.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. Within a system comprising a processor and a memory, a method of processing an Extensible Markup Language (XML) document, the method comprising:

loading, via the processor, an execution plan into a virtual machine, wherein the execution plan represents an XML schema and specifies a hierarchy of XML components, and wherein the virtual machine comprises a plurality of dedicated XML processing functions specifically corresponding to the XML components specified by the XML schema;

selectively invoking, via the processor, the XML processing functions available within the virtual machine according to the execution plan, wherein the XML processing functions operate upon an XML document; and outputting, via the processor, an indication of whether the XML document is valid according to the XML processing functions.

2. The computer-implemented method of claim 1, wherein selectively invoking XML processing functions comprises:

identifying a bytecode instruction within the execution plan;

selecting an XML processing function associated with the bytecode instruction from the plurality of XML processing functions; and executing the selected XML processing function.

3. The computer-implemented method of claim 1, wherein the virtual machine consists only of functions that process XML documents.

4. The computer-implemented method of claim 1, wherein each XML processing function is a native function.

5. The computer-implemented method of claim 1, wherein selectively invoking XML processing functions further comprises selecting an XML processing function that reads a section of the XML document according to an expected component type of the section.

6. The computer-implemented method of claim 1, wherein selectively invoking XML processing functions further comprises selecting an XML processing function that checks a section of the XML document against a component type associated with the section.

7. The computer-implemented method of claim 1, wherein selectively invoking XML processing functions further comprises at least one of:
   selecting an XML processing function that counts a number of occurrences of a component in the XML document; or
   selecting an XML processing function that performs flow control within the virtual machine.

8. The computer-implemented method of claim 1, further comprising, via the processor, outputting supplemental information with the indication.

9. The computer-implemented method of claim 1, further comprising:
   receiving, via the processor, the XML schema, the XML schema comprising a plurality of components;
   determining, via the processor, a hierarchy of the plurality of components of the XML schema;
   creating, via the processor, the execution plan, the execution plan specifying a hierarchy of XML processing instructions corresponding to the XML processing functions of the virtual machine, wherein the hierarchy of XML processing instructions is determined according to the hierarchy of components of the XML schema; and
   compiling, via the processor, the execution plan to generate a bytecode version of the execution plan that is executed by the virtual machine.

10. The computer-implemented method of claim 1, further comprising selecting the execution plan from a plurality of execution plans, wherein each of the plurality of execution plans is derived from a different XML schema.

11. A system that processes Extensible Markup Language (XML) documents, the system comprising:
   an information processing system comprising a processor and memory; and
   a virtual machine executing within the information processing system via the processor, wherein the virtual machine is configured to parse XML schema;
   wherein the processor loads an execution plan into the virtual machine, the execution plan representing an XML schema and specifying a hierarchy of XML components, and wherein virtual machine comprises a plurality of dedicated XML processing functions specifically corresponding to the XML components specified by the XML schema.

12. The system of claim 11, further comprising an execution plan that, when executed by the virtual machine, selectively invokes XML processing functions selected from the plurality of XML processing functions according to an XML schema.

13. A computer program product comprising:
   a computer-usable storage medium having computer-usable program code stored thereon that, when executed by a system comprising a processor and a memory, causes the system to perform a method of processing an Extensible Markup Language (XML) document, the method comprising:
   loading, via the processor, an execution plan into a virtual machine, wherein the execution plan represents an XML schema and specifies a hierarchy of XML components, and wherein the virtual machine comprises a plurality of dedicated XML processing functions specifically corresponding to the XML components specified by the XML schema;
   selectively invoking, via the processor, the XML processing functions available within the virtual machine according to the execution plan, wherein the XML processing functions operate upon an XML document; and
   outputting, via the processor, an indication of whether the XML document is valid according to the XML processing functions.

14. The computer program product of claim 13, wherein selectively invoking XML processing functions comprises:
   identifying, via the processor, a bytecode instruction within the execution plan;
   selecting, via the processor, an XML processing function associated with the bytecode instruction from the plurality of XML processing functions; and
   executing, via the processor, the selected XML processing function.

15. The computer program product of claim 13, wherein the virtual machine consists only of functions that process XML documents.

16. The computer program product of claim 13, wherein each XML processing function is a native function.

17. The computer program product of claim 13, wherein selectively invoking XML processing functions further comprises at least one process selected from a group consisting of selecting an XML processing function that reads a section of the XML document according to an expected component type of the section and selecting an XML processing function that checks a section of the XML document against a component type associated with the section.

18. The computer program product of claim 13, wherein selectively invoking XML processing functions further comprises selecting an XML processing function that counts a number of occurrences of a component in the XML document.

19. The computer program product of claim 13, wherein selectively invoking XML processing functions further comprises selecting an XML processing function that performs flow control within the virtual machine.

20. The computer program product of claim 13, wherein the method further comprises:
   receiving, via the processor, the XML schema, the XML schema comprising a plurality of components;
   determining, via the processor, a hierarchy of the plurality of components of the XML schema;
   creating, via the processor, the execution plan, the execution plan specifying a hierarchy of XML processing instructions corresponding to the XML processing functions of the virtual machine, wherein the hierarchy of XML processing instructions is determined according to the hierarchy of components of the XML schema; and
   compiling, via the processor, the execution plan to generate a bytecode version of the execution plan that is executed by the virtual machine.

* * * * *